US011113936B2

(12) United States Patent
Fessard

(10) Patent No.: US 11,113,936 B2
(45) Date of Patent: Sep. 7, 2021

(54) GEOLOCATION METHOD AND ANTI-THEFT TRACER IMPLEMENTING SUCH A METHOD

(71) Applicant: M2AIM, Les Alluets-le-Roi (FR)

(72) Inventor: Julien Fessard, Les Alluets-le-Roi (FR)

(73) Assignee: M2AIM, Les Alluets-le-Roi (FR)

( * ) Notice: Subject to any disclaimer, the term of this patent is extended or adjusted under 35 U.S.C. 154(b) by 0 days.

(21) Appl. No.: 16/641,304

(22) PCT Filed: Aug. 22, 2018

(86) PCT No.: PCT/FR2018/052089
§ 371 (c)(1),
(2) Date: Feb. 24, 2020

(87) PCT Pub. No.: WO2019/038504
PCT Pub. Date: Feb. 28, 2019

(65) Prior Publication Data
US 2020/0388122 A1    Dec. 10, 2020

(30) Foreign Application Priority Data

Aug. 23, 2017 (FR) ...................................... 1770882

(51) Int. Cl.
*G08B 13/14* (2006.01)
*G01S 19/24* (2010.01)

(52) U.S. Cl.
CPC .......... *G08B 13/1436* (2013.01); *G01S 19/24* (2013.01)

(58) Field of Classification Search
None
See application file for complete search history.

(56) References Cited

U.S. PATENT DOCUMENTS 8,560,229 B1 * 10/2013 Park ....................... G01C 21/20
701/433
9,372,622 B2 * 6/2016 Huang ................ G06F 3/04883
(Continued)

FOREIGN PATENT DOCUMENTS

CN        208034674 U  * 11/2018
EP        2750115 A1     7/2014
(Continued)

OTHER PUBLICATIONS

International Search Report and Written Opinion in Corresponding Patent Application No. PCT/US2020/052089 dated Feb. 28, 2020. 8 pages.

*Primary Examiner* — Fekadeselassie Girma
(74) *Attorney, Agent, or Firm* — Leason Ellis LLP

(57) ABSTRACT

The invention concerns a geolocation method (200) and an anti-theft tracer (1) for inserting in the butt (21) of a firearm (2), said geolocation method (200) making it possible to determine the geographical coordinates of said anti-theft tracer (1) and to detect an unwanted movement. The geolocation method (200) also makes it possible to communicate with a device in order to transmit data relating to the movement of the anti-theft tracer (1). The present invention also concerns such an anti-theft tracer (1) which comprises, in particular, damping means (102) for reducing the vibrations generated by use of the firearm (2) and transmitted to the electronic components of said anti-theft tracer (1).

16 Claims, 4 Drawing Sheets

(56) References Cited

U.S. PATENT DOCUMENTS

| | | | |
|---|---|---|---|
| 2004/0226793 A1* | 11/2004 | Tilby | A45C 13/02 190/125 |
| 2007/0271348 A1* | 11/2007 | Yang | H04L 67/18 709/206 |
| 2016/0116241 A1 | 4/2016 | Efremkina | |
| 2016/0194135 A1* | 7/2016 | Baker | F41C 33/06 206/523 |
| 2016/0330593 A1 | 11/2016 | Caperell | |
| 2018/0192374 A1* | 7/2018 | Jain | H04W 4/029 |
| 2020/0329451 A1* | 10/2020 | Omar | H04W 4/029 |

FOREIGN PATENT DOCUMENTS

| | | | |
|---|---|---|---|
| GB | 2267591 A | | 12/1993 |
| JP | 3189034 U | * | 2/2014 |

* cited by examiner

GEOLOCATION METHOD AND ANTI-THEFT TRACER IMPLEMENTING SUCH A METHOD

CROSS-REFERENCE TO RELATED PATENT APPLICATIONS

This application is a U.S. National Stage Application under 35 U.S.C. § 371 of International Patent Application No. PCT/FR2018/052089, filed Aug. 22, 2018, which claims the benefit of priority of French Patent Application number 1770882 filed Aug. 23, 2017, both of which are incorporated by reference in their entireties. The International Application was published on Feb. 28, 2019, as International Publication No. WO 2019/038504 A1.

TECHNICAL FIELD

The present invention relates to the localization of a firearm. More particularly, the invention relates to a geolocation method for a firearm, and an anti-theft tracer that is intended to be accommodated in a firearm of this kind. More particularly again, the present invention relates to the field of ball trap rifles, as well as carbines and hunting rifles.

PRIOR ART

In the field of firearms, given the safety standards surrounding the possession of arms and personal use, the users are increasingly feeling the need to be able to determine the position of their firearm. Indeed, when a firearm is stored in a security cabinet, the position thereof is known provided that no one opens said security cabinet unexpectedly or with the intention of stealing the firearm. Furthermore, when using firearms, for example during sports events or on hunting days, the situation sometimes arises where the firearm is not always in the hands of the user thereof, for example during meals or when the users are in the hotel.

In the more particular field of ball trap competitions, the competitors are often forced to be apart from their firearms, for example at mealtimes, without, however, placing said firearms safely in security cabinets. Some thus place their firearms in racks which are accessible to everyone, with no particular security, whereas others shut their firearms in their cars, parked close by, so that their firearm is not freely accessible.

In this context, it is thus found that mealtimes are often conducive to the theft of some of said firearms that are left with less vigilance.

Given the value of firearms, the civil or even criminal liabilities of their owners, and the safety aspects surrounding their use, a need has recently arisen for being able to geolocate the position of a firearm in order to be able to know the position thereof without necessarily being close by.

An aim of the present invention is therefore that of proposing a new geolocation method for a firearm in order to respond to at least a large part of the problems above, and to furthermore lead to other advantages.

In particular, another aim of the present invention is that of proposing a new anti-theft tracer for a firearm that makes it possible to know the position of the firearm at any moment.

Another aim of the present invention is therefore that of reducing the risks of theft of such a firearm.

DISCLOSURE OF THE INVENTION

According to a first aspect of the invention, at least one of the above aims is achieved by a geolocation method for a firearm using an anti-theft tracer, said geolocation method comprising the following steps:
   a step of determining geographic coordinates of the anti-theft tracer, using a geolocation module of said anti-theft tracer;
   a step of transmitting the geographic coordinates to a remote server, by means of a first or a second telecommunications module of the anti-theft tracer;
   a timeout step; and, following the timeout step,
   a step of putting the anti-theft tracer onto standby, in which an electronic circuit of said anti-theft tracer cuts off the electrical supply of the geolocation module and of the second telecommunications module.

The geolocation method thus makes it possible to determine a position of the corresponding anti-theft tracer that is installed in a firearm, by means of the geographic coordinates determined by the geolocation module of said anti-theft tracer. The geolocation module is more particularly a GPS module ("Global Positioning System," indicating geo positioning by means of a satellite) or GLONASS (Russian acronym meaning a global navigation satellite system) which make it possible to determine coordinates, referred to as GPS, by means of triangulation of synchronized signals emitted by a plurality of satellites. Thus, during the step of determining the geographic coordinates, the geolocation module receives a plurality of synchronized signals emitted by the satellites, and calculates the corresponding geographic coordinates, typically a latitude and a longitude and/or an elevation. In a more general manner, the geolocation module is designed to receive a plurality of electromagnetic signals that originate, for example, from a constellation of satellites such as for the GPS or GLONASS systems, or from any other wireless terrestrial communications means, for example via relay antennas. The geolocation module is also designed to determine at least one geographic coordinate by means of triangulation of the received electromagnetic signals.

During the step of transmitting the geographic coordinates to the remote server, the anti-theft tracer thus transfers the position thereof to said remote server which, as will be described in the following, can interpret the geographic coordinates, and more particularly the changes thereof over time, and, if applicable, warn the owner of the corresponding firearm, on the basis of criteria which will be defined below. The transfer of the geographic coordinates is achieved by means of a telecommunications network, via telecommunications modules of the anti-theft tracer, for example by means of radio transmission. The telecommunications modules of the anti-theft tracer are designed to be able to output data to the remote server and/or to receive data from the remote server.

In order to save the electrical energy thereof, the anti-theft tracer remains active during a timeout period predefined by the user of the geolocation method according to the first aspect of the invention. In particular, during the timeout step, the geolocation module and/or the first telecommunications module and/or the second telecommunications module of the anti-theft tracer are supplied electrically, in order to be able to operate, if necessary, for example on the basis of a command transmitted by the remote server. In addition to the timeout period, the anti-theft tracer is designed so as to reduce the electrical consumption thereof and to save the battery thereof. The electronic circuit of the anti-theft tracer cuts the electrical supply of the geolocation module and of the second telecommunications module; only the first telecommunications module is still supplied electrically, and thus active, in order to be able to emit and/or receive data to or from the remote server.

The geolocation method according to the first aspect of the invention may advantageously comprise at least one of the improvements below, it being possible for the technical features forming said improvements to be taken individually or in combination:

the geolocation method according to the first aspect of the invention comprises a second step of determining the geographic coordinates and of transmitting said geographical data to the remote server at the end of the timeout step and before the anti-theft tracer is put onto standby;

the first telecommunications module is designed to communicate with the remote server, for example according to an SMS communications protocol, and/or the second telecommunications module is designed to communicate with the remote server, for example according to a GPRS or TCP/IP or LoRaWAN or ISM radio or VHF radio network protocol. The SMS (Short Message Service) communications protocol makes it possible to communicate with the remote server in a manner having the lowest access conditions for a telecommunications network, thus making it possible for the remote server and the anti-theft tracer to communicate with one another in a very large number of situations. The GPRS (General Packet Radio Service) network protocol is a protocol originating from the GSM (Global System for Mobile Communication) standard, and makes it possible to transfer larger amounts of data to or from the remote server, and in a manner having increased transfer rates compared with the SMS communications protocol. The TCP/IP protocol (Transmission Control Protocol & Internet Protocol) includes all the network protocols used for data transfer on the Internet. The LoRaWAN (Long Range Wide Area Network) protocol is a wide area network which allows for narrowband communication, by radio, of objects that communicate in accordance with the LoRa technology and are connected to the Internet via gateways. The LoRaWAN protocol is used in particular in the field of objects, which include the anti-theft tracer of the present invention, that are connected to machine-to-machine (M2M) networks and Smart cities. The ISM radio and VHF radio telecommunications correspond, respectively, to radio communication via frequency bands referred to as "Industrial, Scientific and Medical," and "Very High Frequency;"

optionally, the second telecommunications module also makes it possible to geolocate the anti-theft tracer using a WIFI network protocol, when the geolocation module does not receive any signal that allows it to determine the geographic coordinates, for example when the firearm bearing the anti-theft tracer is located inside a building. In this case, the second telecommunications module uses the WIFI network in order to determine the position of the anti-theft tracer. The WIFI (Wireless Fidelity) network protocol is a set of wireless communications protocols that are governed by the standards of the group IEEE 802.11 and make it possible for the anti-theft tracer and the remote server to communicate with one another, in the presence of a wireless Internet network of this kind. More particularly, in this case the anti-theft tracer catalogues all the WIFI access points to which it has access, and transmits the corresponding MAC addresses to the remote server, in order for said server to determine the position of said anti-theft tracer from the respective geographical positions of each of the transmitted MAC addresses;

according to a first advantageous version of the geolocation method according to the first aspect of the invention, the anti-theft tracer comprises an accelerometer and, if said accelerometer detects an acceleration of said anti-theft tracer greater than a reference threshold, when said anti-theft tracer is on standby, then (i) the electronic circuit of the anti-theft tracer reactivates the first and/or the second telecommunications module and the geolocation module, (ii) the geolocation module determines the geographic coordinates of the anti-theft tracer, and (iii) the first or the second telecommunications module transmits the geographic coordinates to the remote server. This advantageous configuration thus makes it possible to detect a movement of the anti-theft tracer, and thus of the firearm on which it is installed, even though said anti-theft tracer is on standby. If the acceleration experienced by the anti-theft tracer is greater than the reference threshold, then said acceleration is interpreted as a movement of the firearm, and the geolocation method according to the first aspect of the invention triggers a query of the anti-theft tracer in order to determine the position thereof. Subsequently, the geolocation method according to the first aspect of the invention can comprise determination of the geographic coordinates and the transmission thereof to the remote server in accordance with a specified query frequency, for example less than 1 Hz, and preferably of between 0.1 Hz and 1 mHz;

according to a second advantageous version of the geolocation method according to the first aspect of the invention, the anti-theft tracer comprises an accelerometer and, if said accelerometer detects an acceleration of said anti-theft tracer greater than a reference threshold, when said anti-theft tracer is on standby, then the first telecommunications module transmits a movement signal to the remote server. This advantageous configuration thus makes it possible to detect a movement of the anti-theft tracer, and thus of the firearm on which it is installed, even though said anti-theft tracer is on standby. If the acceleration experienced by the anti-theft tracer is greater than the reference threshold, then said acceleration is interpreted as a movement of the firearm, and the geolocation method according to the first aspect of the invention sends the movement signal to the remote server by means of the first telecommunications module which always remains supplied electrically, in order to be able to possibly warn the owner of the firearm;

the remote server transmits a first warning signal to a mobile telephone if the geographic coordinates determined by the geolocation module change relative to the reference geographic coordinates taken before entering standby mode, or if a movement signal was emitted by the anti-theft tracer. This advantageous configuration thus makes it possible to warn the owner of the firearm that his firearm has moved, thus allowing him to check whether this movement is undesired;

the remote server transmits a second warning signal to the mobile telephone if the geographic coordinates determined by the geolocation module show a movement of the anti-theft tracer that is greater than a reference amplitude. The reference amplitude is advantageously predefined by the user of the geolocation method according to the first aspect of the invention. The reference amplitude corresponds, for example, to a guard zone, one dimension of which corresponds to the reference amplitude. When it has been detected that the anti-theft tracer has been moved within said guard zone, the remote server queries said anti-theft tracer, by means of the first or the second telecommunications module, at a predefined refresh rate, for example of the order of 1 Hz. In order to achieve this, a command is transferred by the remote server to the corresponding telecommunications module, and said command is interpreted by the anti-theft tracer in order to control the geolocation module so as to determine an updated geographic coordinate of the anti-theft tracer. Subsequently, the anti-theft tracer transmits the updated geographic coordinate to the remote server, and said remote server transfers said geographic coordinates to the mobile telephone, in order to allow for visualization of the movement of the anti-theft tracer in the guard zone. In other words, the remote server generates a warning that contains the geographic coordinates, and transmits this to the mobile telephone.

According to a second aspect of the invention, an anti-theft tracer is proposed which is intended to be housed in a butt of a firearm, said anti-theft tracer comprising means that are designed to implement all the steps of the geolocation method according to the first aspect of the invention or according to any of the improvements thereof. In particular, the anti-theft tracer according to the second aspect of the invention comprises a housing that accommodates:
- a geolocation module;
- a first telecommunications module which is designed to be able to communicate with the remote server, for example according to an SMS communications protocol;
- a second telecommunications module which is designed to be able to communicate with the remote server, for example according to a GPRS or LoRaWAN or TCP/IP or ISM radio or VHF radio network protocol;
- a battery for electrically supplying the geolocation module and/or the first telecommunications module and/or the second telecommunications module;
- an electronic circuit that is designed to control the geolocation module, the first and the second telecommunications module, and the battery;

said anti-theft tracer comprising a damping device in order to be able to damp vibrations when said anti-theft tracer is accommodated in a reception recess of the butt.

The anti-theft tracer according to the second aspect of the invention may advantageously comprise at least one of the improvements below, it being possible for the technical features forming said improvements to be taken individually or in combination:
- the anti-theft tracer according to the second aspect of the invention comprises an accelerometer.

This advantageous configuration makes it possible to be able to detect an acceleration of the anti-theft tracer and/or movement of the anti-theft tracer when said anti-theft tracer is on standby, as described above, or when the geolocation module is not able to determine the geographic coordinates;
- the anti-theft tracer according to the second aspect of the invention comprises an electrical connector for electrically connecting the battery to an electrical system. This advantageous configuration makes it possible to provide an external electrical supply, making it possible for said anti-theft tracer to operate and/or to recharge the battery thereof;
- the anti-theft tracer comprises an electrical winding that is connected to the battery, in order to be able to generate an induced current for recharging the battery when a magnetic field is applied to the electrical winding. Advantageously, the electrical winding is connected to the battery via a charging circuit, in order to shape an electrical signal generated from the induced current, and making it possible to charge said battery;
- the damping device of the anti-theft tracer according to the second aspect of the invention is formed on at least one peripheral surface of the housing. This advantageous configuration makes it possible to damp oscillations and/or shocks which propagate in the butt when the firearm is used;
- the damping device comprises a plurality of grooves that extend on at least one peripheral surface of the housing, between a first lateral edge and a second opposing lateral edge of said housing. Thus, at least one peripheral surface of the housing that is intended to be in contact with the recess of the butt is not planar and smooth, but has a plurality of reliefs formed by the grooves, such that the shapes located between two adjacent grooves are elastically deformable and thus make it possible to damp a mechanical wave that is transmitted by the butt to the housing of the anti-theft tracer according to the second aspect of the invention;
- advantageously, each groove extends in a straight manner, between the first lateral edge and the second lateral edge. Preferably, all the grooves are mutually parallel;
- the grooves are regularly spaced from one another. In particular, the grooves are spaced from one another in a longitudinal direction of the housing, a longitudinal dimension of said housing measured in accordance with said longitudinal direction being greater than a lateral dimension of the housing measured between the first lateral edge and the second lateral edge. In other words, the grooves form a periodic pattern, a direction of repetition of which periodic pattern is in parallel with or substantially in parallel with the larger side of the housing;
- in a plane in parallel with a lateral edge of the housing, all the grooves of the plurality of grooves have the same profile. According to a first embodiment, the profile of the grooves is sinusoidal. According to a second embodiment, the profile of the grooves is in the form of a slot. According to a third preferred embodiment, the profile of the grooves is triangular;
- in particular, each groove is formed by a first segment and a second segment that is adjacent to said first segment, said first segment being oriented in accordance with a first angle with respect to the longitudinal direction of the housing, and said second segment being oriented in accordance with a second angle with respect to said longitudinal direction of the housing. The first angle formed between the first segment and the longitudinal direction of the housing is between 90° and 135°, and is preferably equal to 90°. The second angle formed between the second segment and the longitudinal direction of the housing is between 0° and 60°, and is preferably equal to 30°;
- according to a first variant, the first segment and/or the second segment are linear. According to a second variant, the first segment and/or the second segment are convex. According to a third variant, the first segment and/or the second segment are concave;
- advantageously, at least some of the grooves extend in a manner peripheral to the housing. In other words, at least some of the grooves extend all around the housing, in a manner so as to be able to damp, in all directions, a mechanical wave propagating inside the butt;

the anti-theft tracer according to the second aspect of the invention comprises at least one shim that is designed to be able to be fixed in a non-movable manner to a bearing surface of the housing that is located opposite said at least one shim. Said advantageous configuration makes it possible to adapt the lateral dimensions of the anti-theft tracer on the basis of the dimensions of the recess of the butt in which said anti-theft tracer is intended to be accommodated, in order to reduce the existence of clearance between the housing of said anti-theft tracer and the recess of the butt. Said configuration makes it possible to improve the mechanical coupling between the anti-theft tracer and the butt, and to limit the movements of said anti-theft tracer in the recess thereof;

each shim comprises an anchoring device that collaborates with a complementary anchoring device that is formed on the bearing surface of the housing and is located opposite said anchoring device. Said configuration makes it possible to fix each shim to the housing in a non-definitive manner;

in particular, the anchoring device of the shim collaborates with the complementary anchoring device of the housing by means of engagement of complementary shapes. By way of non-limiting example, the anchoring device of the shim comprises a plurality of structures which extend so as to project, with respect to a bearing surface of said shim, against the bearing surface opposite the housing, the complementary anchoring device of said housing comprising a plurality of depressions that are formed on the bearing surface opposite, and designed so as to accommodate the corresponding structure. In this case, the structures of the anchoring device of the shim are advantageously spaced regularly along a longitudinal direction of said shim, and the depressions of said complementary anchoring device of the housing are spaced regularly along a longitudinal direction of said housing. Alternatively, the complementary anchoring device of the housing comprises a plurality of structures which extend so as to project, with respect to a bearing surface of said housing, and against the bearing surface opposite the shim, the anchoring device of said shim comprising a plurality of depressions that are formed on the bearing surface opposite, and designed so as to accommodate the corresponding structure;

a longitudinal dimension of the shim is greater than a longitudinal dimension of the housing in order to facilitate the manipulation thereof, and in particular the fixing thereof to or the detachment thereof from said housing;

in a plane perpendicular to the longitudinal dimension of the shim, a peripheral contour of the surface opposite the bearing surface of the shim is convex;

each shim comprises a through-hole in the region of a longitudinal end, in order to facilitate the detachment thereof from the housing, in particular by means of inserting a hook that makes it possible to withdraw said shim when it is mounted on the housing and in the butt of the firearm;

advantageously, each shim has a state of the peripheral surface thereof that is intended to be brought into contact with the recess of the butt which resembles that of the housing, and more particularly the damping device. In particular, each shim comprises a plurality of grooves that extend on a surface opposite the bearing surface of said shim, between a first lateral edge and a second opposing lateral edge of said shim;

each groove extends in a straight manner, between the first lateral edge and the second lateral edge of said shim;

the grooves are regularly spaced from one another. More particularly, a spacing pitch of the grooves of each shim is advantageously equal to a spacing pitch of the grooves of the housing;

the grooves are spaced from one another, in a longitudinal direction of the shim;

in a transverse plane in parallel with a lateral edge of the housing, all the grooves of the plurality of grooves have the same profile. More particularly, a profile of the grooves of each shim is advantageously identical to the profile of the grooves of the housing. In particular, according to a first variant the profile of the grooves of the shim is sinusoidal; according to a second variant the profile of the grooves of the second shim is a slot, and according to a third variant the profile of the grooves of the shim is triangular;

each groove is formed by a first section and a second section that is adjacent to said first section, said first section being oriented in accordance with a first angle with respect to the longitudinal direction of the shim, and said second section being oriented in accordance with a second angle with respect to said longitudinal direction of said shim. In particular, the first angle formed between the first section and the longitudinal direction of the shim is between 90° and 135°, and is preferably equal to 90°. The first angle of the first section of the shim is advantageously equal to the first angle of the first segment of the housing. The second angle formed between the second section and the longitudinal direction of the shim is between 0° and 60°, and is preferably equal to 30°. The second angle of the second section of the shim is advantageously equal to the second angle of the second segment of the housing;

according to a first embodiment, the first section and/or the second section of the shim are linear. According to a second embodiment, the first section and/or the second section of the shim are convex. According to a third embodiment, the first section and/or the second section of the shim are concave;

advantageously, the grooves of each shim are located in the extension of the grooves of the housing;

the housing and/or the at least one shim are made of a deformable material.

In other words, the deformable material of which the housing and/or the at least one shim is made has an increased modulus of elasticity in order to allow for elastic deformation. Subsequently, said advantageous configuration also makes it possible to better adapt the housing and/or the at least one shim to a plurality of shapes and dimensions of the recess of the butt of the firearm, and/or better surface contact and/or better damping of the vibrations that are produced when using the firearm and transmitted to the anti-theft tracer via the butt. By way of non-limiting example, the deformable material comprises a polymer and/or silicone material. In an advantageous manner, the geolocation module, the first and the second telecommunications module, the battery, and the electronic circuit of the anti-theft tracer and/or the electrical winding of the charging circuit thereof are overmolded in the deformable material.

A third aspect of the invention proposes a butt of a firearm comprising a cavity in which the anti-theft tracer according to the second aspect of the invention or according to any of the improvements thereof is accommodated.

In an advantageous manner, the anti-theft tracer is pressed-in, by force, into the cavity of the butt according to the third aspect of the invention, the damping device of said anti-theft tracer collaborating with at least one wall of the cavity of the butt, such that said damping device is deformed in an elastic manner, at least in part, when the anti-theft tracer is accommodated in said cavity, in order to keep it in position in the cavity by preventing any movement and/or reducing an amplitude of the vibrations and/or shocks transmitted to said anti-theft tracer during manipulation of the butt or use of the corresponding firearm.

Various embodiments of the invention are possible, integrating, according to all the possible combinations thereof, the different optional features disclosed here.

DESCRIPTION OF THE FIGURES

Other features and advantages of the invention will become clear from the following description and various embodiments, given for information purposes and by way of non-limiting example, and with reference to the accompanying drawings, in which.

Figure 1:
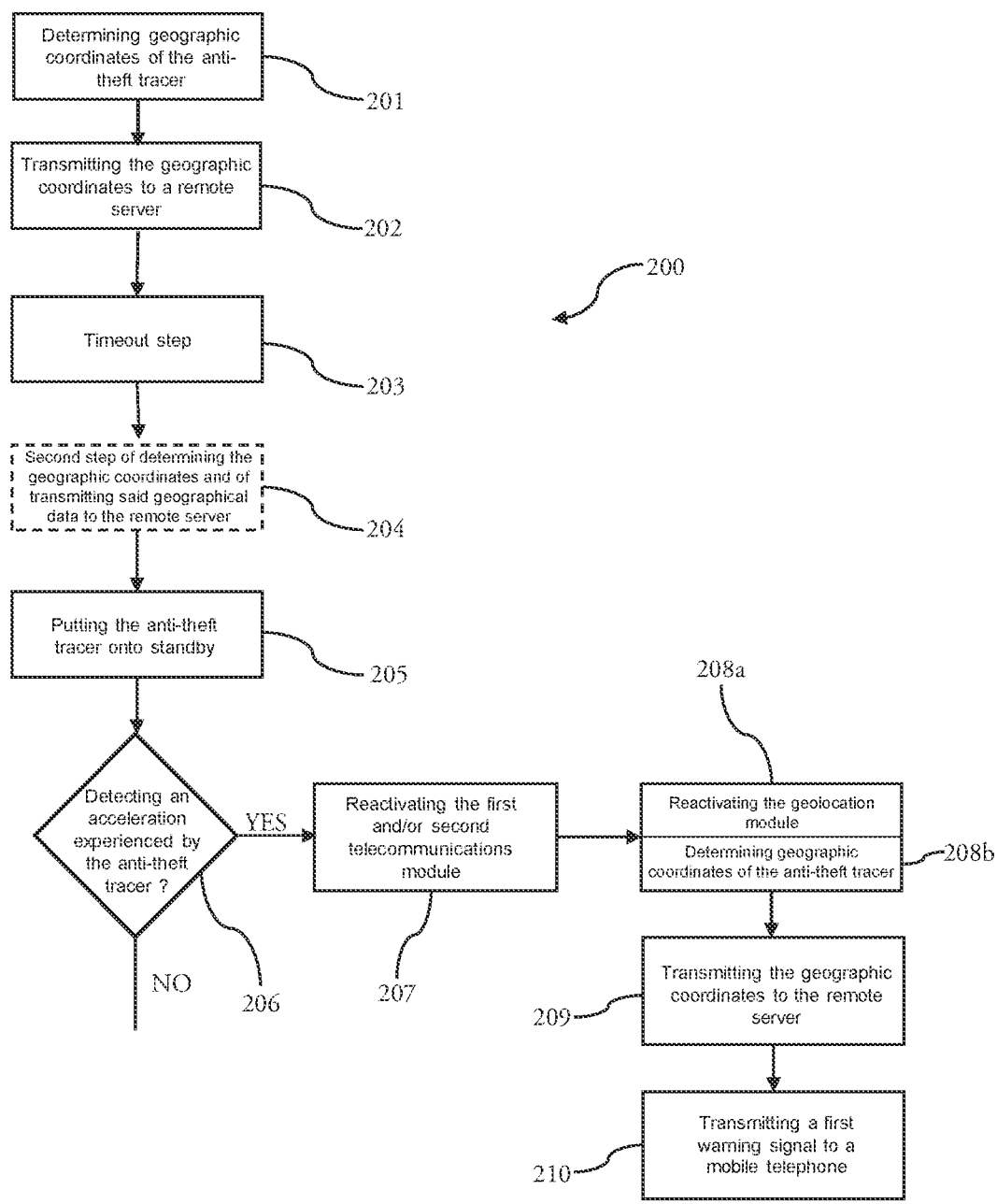
FIG. 1 is an embodiment of the geolocation method according to the first aspect of the invention.

Of course, the features, the variants, and the different embodiments of the invention may be associated with one another, in accordance with various combinations, insofar as they are not mutually incompatible or exclusive. It is in particular possible to envisage variants of the invention that comprise only a selection of features described in the following, in a manner isolated from the other features described, if this selection of features is sufficient for providing a technical advantage or for distinguishing the invention from the prior art.

In particular, all the variants and all the embodiments described can be combined with one another if there is no technical reason opposing this combination.

In the figures, the elements that are the same in several figures are provided with the same reference sign. The optional steps of the geolocation method according to the first aspect of the invention are shown in dotted lines in the drawings.

DETAILED DESCRIPTION OF THE INVENTION

With reference to FIG. 1, an embodiment of the geolocation method 200 for a firearm using an anti-theft tracer can comprise the following steps:

a step 201 of determining geographic coordinates of the anti-theft tracer, using the geolocation module described above. The geolocation module makes it possible to determine GPS coordinates by means of triangulation of synchronized signals that are emitted by a plurality of satellites, said geolocation module receiving a plurality of said synchronized signals and calculating the corresponding geographic coordinates, and in particular a latitude and a longitude of the anti-theft tracer;

a step 202 of transmitting the geographic coordinates to a remote server, by means of a first or a second telecommunications module of the anti-theft tracer. The first telecommunications module is designed to communicate with the remote server according to an SMS communications protocol; and the second telecommunications module is designed to communicate with the remote server according to a GPRS or LoRaWAN network protocol for example;

a timeout step 203;

optionally, following the timeout step 203, a second step 204 of determining the geographic coordinates and of transmitting said geographical data to the remote server;

following the timeout step 203 and the optional second step 204, a step 205 of putting the anti-theft tracer onto standby, in which an electronic circuit of said anti-theft tracer cuts off an electrical supply of the geolocation module and of the second telecommunications module in order to save the available electrical energy and store it in a battery of the anti-theft tracer, said battery being electrically connected to at least one geolocation module and to the first and second telecommunications modules.

Said first part of the geolocation method 200 according to the first aspect of the invention makes it possible to determine the geographic coordinates of the anti-theft tracer embedded in the corresponding firearm, while effectively saving the energy resources by controlling the electrical supplies of the modules depending on the use thereof. When the anti-theft tracer is configured in the standby mode thereof, then only the first telecommunications module is supplied electrically, in order to be able to establish a minimum level of communication between the remote server and said anti-theft tracer.

In a preferred variant of the geolocation method 200 according to the first aspect of the invention, the anti-theft tracer comprises an accelerometer that makes it possible to detect an acceleration experienced by said anti-theft tracer, and in particular during the standby state of said anti-theft tracer. Subsequently, the accelerometer is connected to the electronic circuit of the anti-theft tracer in order to be able to always emit at least one electrical signal corresponding to the intensity of the acceleration experienced by said anti-theft tracer, including in the standby state thereof. Preferably, the accelerometer is designed to emit an electrical signal corresponding to the intensity of the acceleration experienced in each spatial direction, and preferably in a first vertical direction, a second horizontal direction, and a third horizontal direction that is perpendicular to the second direction.

Thus, a preferred version of the geolocation method 200 comprises a step 206 of detecting the acceleration experienced by the anti-theft tracer. An amplitude of the electrical signal generated by the accelerometer is then compared to a reference threshold value. If the amplitude of the electrical signal generated by the accelerometer is less than the reference threshold, then the anti-theft tracer is considered to be in the rest state; however, if the amplitude of the electrical signal generated by the accelerometer is greater than the reference threshold, then the anti-theft tracer is considered to be moving. It is thus appropriate to interpret said movement and to possibly trigger a number of actions that will be described in the following.

In this version of the geolocation method 200, the interpretation of the detected movement of the anti-theft tracer is not carried out on said anti-theft tracer, but is performed by the remote server which comprises more sizeable calculation means since they are not restricted by energy issues of said anti-theft tracer. In other words, the anti-theft tracer communicates to the remote server only the geographic coordinates, i.e. it is the remote server which compares the different geographic coordinates in order to determine whether the anti-theft tracer is moving and/or by what distance it has been moved and/or in what direction.

According to the first variant, when a movement is detected by the accelerometer of the anti-theft tracer, the geolocation method 200 comprises a step 209 of communication with the remote server. In this case, the geolocation method 200 implements the first telecommunications module which has not been disconnected by the step 205 of putting on standby, and configures said first telecommunications module in order to transmit a movement signal to the remote server, thus translating the movement of said anti-theft tracer although it was on standby and not supposed to be moved. This configuration makes it possible to transmit a warning signal to the remote server without having to re-energize the other, more energy-consuming, modules of the anti-theft tracer.

Optionally, when the anti-theft tracer is brought out of standby by means of detection of a movement by the accelerometer, the geolocation method 200 comprises a step 207 of configuring the electronic circuit thereof so as to electrically supply the second telecommunications module in order to be able to communicate with the remote server via the GPRS network for example, and to optionally transmit data of larger volumes.

Optionally, when the anti-theft tracer is brought out of standby by means of detection of a movement by the accelerometer, the geolocation method 200 further comprises:
- a step 208a of configuration of the electronic circuit thereof so as to electrically supply the geolocation module; and
- a step 208b of determining the geographic coordinates in order to be able to transfer said geographic coordinates during the step 209 of communication with the remote server.

On the basis of the data transmitted by the anti-theft tracer controlled by the geolocation method 200 according to the first aspect of the invention, the remote server transmits 210 a first warning signal to a mobile apparatus that belongs, for example, to the owner of the firearm with which the anti-theft tracer is associated.

A mobile apparatus is intended to mean a mobile telephone, a tablet or a portable computer for example. In a more general manner, this is any electronic device that comprises telecommunications means that are suitable for sending or receiving data remotely, and in particular with the remote server.

Thus, the geolocation method 200 according to the first aspect of the invention makes it possible to warn the owner of a firearm in which the anti-theft tracer is accommodated, in the event of said anti-theft tracer detecting a movement, a priori not intended, of said firearm.

According to a first variant, once standby has been left, the geolocation method 200 may comprise an iterative step of determining the geographic coordinates at a sampling frequency of the order of 1 Hz or less than 1 Hz; and said geolocation method 200 can also comprise a step of transmitting said geographic coordinates to the remote server, by means of the first or the second telecommunications module, at a refresh rate that is less than or equal to 0.1 Hz. In addition, the geolocation method 200 may also comprise a second step of transmitting the geographic coordinates and/or a first warning signal, for example in the form of a text message, from the remote server to the mobile apparatus of the owner of the firearm, in accordance with a second refresh rate of less than or equal to 0.1 Hz.

Thus, the owner of the firearm is warned regularly, or indeed in real time, of the movement of his firearm. Optionally, the geolocation method comprises a step of graphical representation of the position of the anti-theft tracer on a screen of the mobile apparatus, for example on a card.

According to a second variant that is an alternative to or complementary to the first variant described above, the geolocation method can comprise a step of determining a reference amplitude that corresponds to a guard zone inside which the owner of the firearm with which the anti-theft tracer is associated wishes to monitor the possible movements of his firearm. Subsequently, each time the anti-theft tracer detects a movement within said guard zone and/or at a given refresh rate, for example of less than or equal to 1 Hz, the geolocation method 200 according to the first aspect of the invention comprises a step of transmitting the geographic coordinates to the remote server. Subsequently, the geolocation method 200 comprises a step of transmitting a second warning signal from the remote server to the mobile apparatus of the owner, said second warning signal comprising the geographic coordinates, in order to allow for visualization of the movement of the anti-theft tracer in the guard zone.

When the anti-theft tracer leaves the guard zone, a specific warning message is sent by the remote server.

Figure 2:
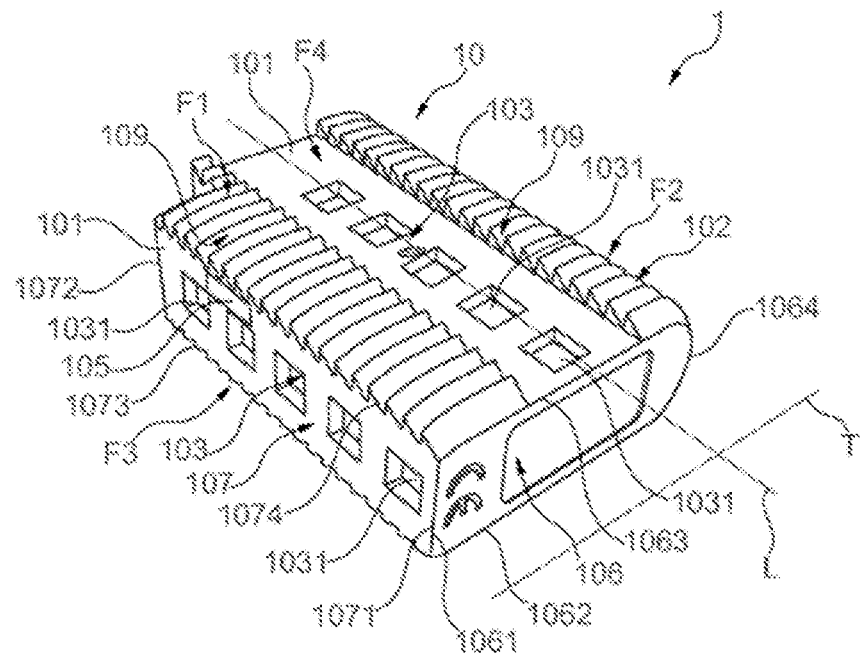
FIG. 2 is a perspective view of a first embodiment of the anti-theft tracer according to the first aspect of the invention.
Figure 3:
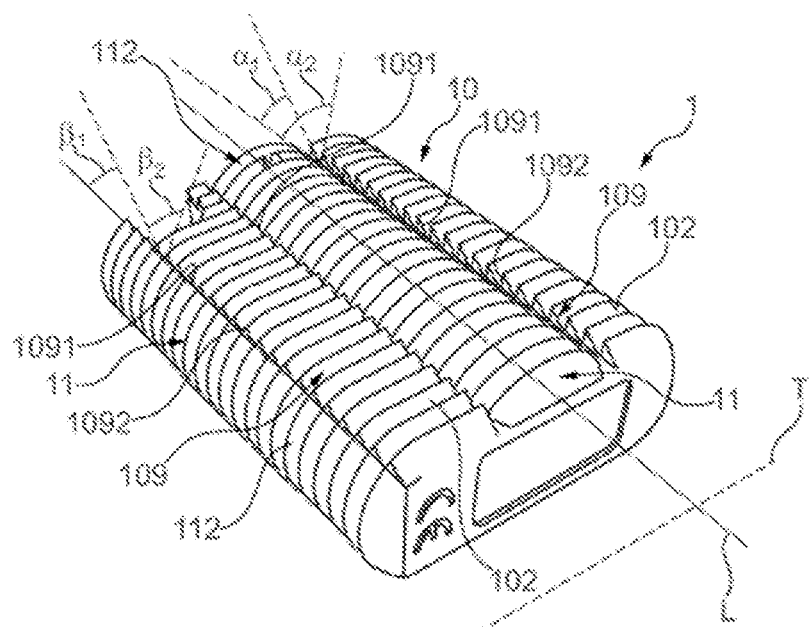
FIG. 3 is a perspective view of a second embodiment of the anti-theft tracer according to the first aspect of the invention.
Figure 4:
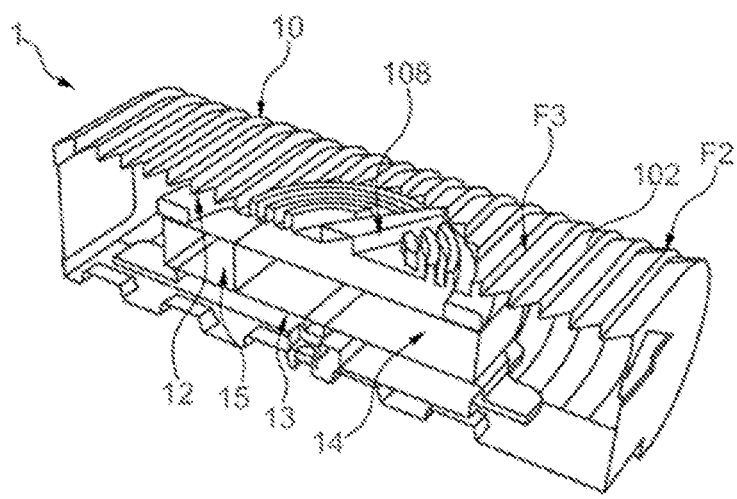
FIG. 4 is a truncated perspective view of an anti-theft tracer according to the first aspect of the invention.

With reference to FIGS. 2 to 4, an anti-theft tracer according to the first aspect of the invention will now be described. An anti-theft tracer of this kind comprises means that are designed for implementing the steps of the geolocation method 200 described above.

As can be seen more particularly in FIG. 4, an anti-theft tracer 1 of this kind comprises a housing 10 that accommodates an electronic card 13 which supports:
- a geolocation module;
- a first telecommunications module which is designed to be able to communicate with a remote server according to an SMS communications protocol;
- a second telecommunications module which is designed to be able to communicate with the remote server according to a GPRS or LoRaWAN or TCP/IP or ISM radio or VHF radio network protocol;
- an electronic circuit that is designed to control the geolocation module, the first and the second telecommunications module, and a battery 15 that is electrically connected to the modules of the electronic card 13;
- optionally an accelerometer in order to detect accelerations experienced by the anti-theft tracer 1;
- a communications antenna 14 for allowing the telecommunications modules to send and/or receive data.

In addition, the housing 10 comprises a damping device 102 for being able to damp mechanical vibrations inside the housing 10, in particular when the anti-theft tracer 1 is accommodated in a firearm, as will be described with reference to FIG. 6.

The electronic card 13 in particular makes it possible to manage the electrical supply of the battery 15 by means of induction.

In an advantageous manner, the electronic card 13, the battery 15, and the telecommunications antenna 14 are embedded within an overmolding material that forms the housing 10. The overmolding material is selected for the mechanical properties thereof, in particular with respect to the specific problem of damping mechanical waves, and of retention within a reception recess in the corresponding firearm. As a result, the overmolding material is preferably a material having a high elastic limit, i.e. a deformable material having a high Young's modulus. By way of non-limiting example, the overmolding material may for example comprise silicone and/or a polymer.

The housing 10 is generally parallelepipedic in shape.

In a first plane that is simultaneously perpendicular to a longitudinal axis L and to a transverse axis T, a transverse section 106 of the housing 10 is formed by a contour comprising two opposing parallel sides 1062, 1063 and connected, at a first end, to two opposing parallel sides, by means of a straight segment 1061. At a second end, the two opposing parallel sides 1062, 1063 are interconnected by a curved portion 1064.

In a second plane that is simultaneously perpendicular to the first plane and to the transverse axis T, a lateral section 107 of the housing 10 is formed by a contour comprising two opposing parallel segments 1071, 1072. The two opposing parallel segments 1071, 1072 are interconnected by two grooved portions 1073, 1074 which will be described in the following.

A technical problem specific to the field of firearms is associated with a strong recoil of the firearms when a shot is fired. The recoil causes propagation of mechanical and/or vibrational waves in the firearm, inside which the anti-theft tracer 1 according to the second aspect of the invention is intended to be accommodated. Subsequently, it is necessary for the housing, which accommodates the various electronic modules and components of the anti-theft tracer, to absorb at least some of the mechanical and vibrational waves thus generated. In addition, it is necessary to keep the anti-theft tracer in position in the reception recess thereof following a shot and/or, in a more lasting manner, following several shots, in order to avoid having to replace the anti-theft tracer and to prevent it from deteriorating due to these movements within the reception recess and to protect the various components, in particular electronic ones, of the anti-theft tracer.

For this purpose, the damping device 102 of the anti-theft tracer 1 is formed on at least one peripheral surface of the housing 10. In the example shown in FIGS. 1 and 4, the damping device 102 comprises a plurality of grooves 109 that extend over at least one peripheral surface of the housing 10. More particularly, as can be seen in FIGS. 1 and 4, the damping device 102 comprises grooves 109 that are formed on a plurality of faces of the housing 10:
- an upper face F1 formed in a plane of the housing 10 comprising the longitudinal axis L and the transverse axis T;
- a lower face F3 that is located opposite the upper face F1 of the housing 10;
- a lateral face F3 that is formed by a curved surface and delimited by the curved portion 1064 described above.

The grooves 109 formed on the upper face F1 extend in parallel with the transverse axis T and between a lateral edge of the housing 10 and a central zone F4 of the housing 10. In other words, the central zone F4 of the housing is located on either side of a median longitudinal axis L of the housing 10. The central zone F4 does not have any grooves 109; it is planar as a whole, and forms a bearing surface 101 for a shim 11 which will be described below with reference to FIGS. 3 and 5.

A first portion of the grooves 109 formed on the lower face F3 of the housing 10 extends in parallel with the transverse axis T and between the two lateral edges of the housing 10. A second portion of the grooves 109 formed on the lower face F3 of the housing 10 is interrupted, in the region of a central zone 108 comprising a mark in order to indicate a position of an electrical winding 12 of the anti-theft tracer 1, shown in FIG. 4. The electrical winding 12 is electrically connected to the battery 15 of the anti-theft tracer 1, in order to be able to generate an induced electric current for recharging the battery 15 for inductive coupling, when a magnetic field is applied to the electrical winding 12.

The grooves 109 of the lateral face F2 of the housing 10 extend between the upper face F1 and the lower face F3 of the housing 10.

Advantageously, the faces F1, F2, F3 of the housing 10 comprise the same number of grooves 109. For one face F1, F2, F3 of the housing 10, the dimensions and a shape of the grooves 109 are constant between the two longitudinal ends of the housing 10. In addition, the dimensions and the shapes of the grooves 109 of each of the faces F1, F2, F3 of the housing 10 are identical. The grooves 109 of each of the faces F1, F2, F3 of the housing 10 are all located in the extension of one another. In other words, each row of grooves 109 of one face F1, F2, F3 of the housing 10 is located in the extension of a corresponding row of grooves 109 of the other faces F1, F2, F3 of said housing 10.

Thus, at least one peripheral surface F1, F2, F3 of the housing 10 that is intended to be in contact with the reception recess of the corresponding firearm is not planar and smooth, but rather has a plurality of reliefs formed by the grooves 109, such that the ribs located between two adjacent grooves 109 are elastically deformable and thus make it possible to damp a mechanical wave that is transmitted by the butt of the firearm to the housing 10 of the anti-theft tracer 1.

Each groove 109 of each face F1, F2, F3 of the housing 10 extends in a straight manner, all the grooves 109 of one face F1, F2, F3 of the housing 10, as well as all the grooves 109 of all the faces F1, F2, F3 of said housing 10 being mutually parallel.

The grooves 109 of each face F1, F2, F3 are regularly mutually spaced along the longitudinal axis L of the housing 10.

The grooves 109 of each face F1, F2, F3 of the housing 10 have a triangular profile formed by a first segment 1091 and a second segment 1092 that is adjacent to said first segment 1091. The first segment 109 is oriented in accordance with a first angle $\alpha 1$ relative to the longitudinal axis L of the housing 10. The second segment 1092 is oriented in accordance with a second angle $\alpha 2$ relative to the longitudinal axis L of the housing 10. The first angle $\alpha 1$ is between 90° and 135°, and is preferably equal to 90°. The second angle $\alpha 2$ is between 0° and 60°, and is preferably equal to 30°.

In order to adjust at least one of the lateral dimensions of the housing 10 to the lateral dimensions of a reception recess of the firearm 2 with which the anti-theft tracer 1 is intended to collaborate, the anti-theft tracer 1 can comprise at least one shim 11 that is designed to be able to be fixed in a non-movable manner to a bearing surface 101 of the housing 10 and located opposite said at least one shim 11.

Figure 5:
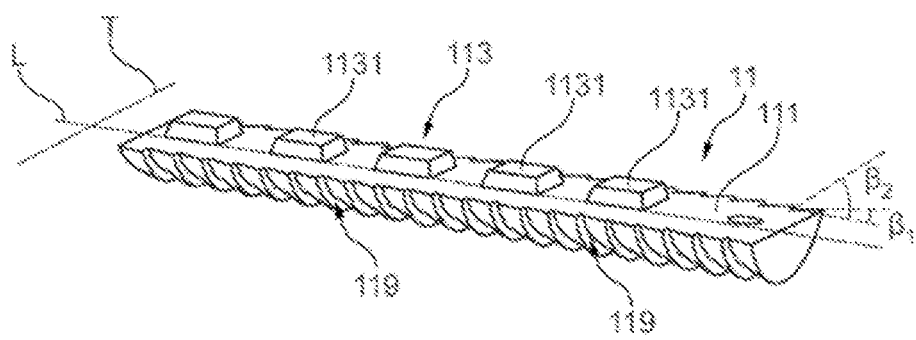
FIG. 5 is a perspective view of a shim that is used together with the housing of the anti-theft tracer shown in FIG. 3.

A shim 11 of this kind is shown in FIG. 5; and the housing 10 shown in FIG. 3 comprises two shims 11:

- a first shim 11 is fixed to the upper face F1 of the housing 10, in order to increase a height of the housing 10 measured according to an axis that is simultaneously perpendicular to the longitudinal axis L and the transverse axis T; and
- a second shim 11 is fixed to the lateral face of the housing 10, in order to increase a width of said housing 10 measured according to the transverse axis T thereof.

With reference to FIG. 1, and in a transverse plane perpendicular to the longitudinal L and transverse T axes, the shim is defined by a semi-circular contour which extends along the longitudinal axis, and a radius of which varies periodically, in order to periodically form grooves 119 along the longitudinal axis L.

The grooves 119 of the shim 11 play the same role as the grooves 109 formed on the surface of the housing 10. As a result, all the properties and features defined for the grooves 109 of the housing 10 apply, mutatis mutandis, to the grooves 119 of the shim 11.

Each groove 119 of the shim 11 extends in a straight manner, all the grooves 119 of the shim 11 being mutually parallel. In addition, the grooves 119 of the shim 11 are in parallel with the grooves 109 of the housing 10.

The grooves 119 of the shim 11 are regularly mutually spaced along the longitudinal axis L of said shim 11. In addition, a spacing pitch of the grooves 119 of the shim 11 is equal to a spacing pitch of the grooves 109 of the housing 110, the spacing pitch being measured along the longitudinal axis L.

The grooves 119 of the shim 11 have a triangular profile formed by a first segment 1191 and a second segment 1192 that is adjacent to said first segment 1191. The first segment 119 is oriented in accordance with a first angle $\beta 1$ relative to the longitudinal axis L of the shim 11. The second segment 1192 is oriented in accordance with a second angle $\beta 2$ relative to the longitudinal axis L of the shim 11. The first angle $\beta 1$ is between 90° and 135°, and is preferably equal to 90°. The second angle $\beta 2$ is between 0° and 60°, and is preferably equal to 30°.

In order to fix each shim 11 to the housing 10 in a non-permanent manner, said shim 11 comprises an anchoring device 113 and said housing 10 comprises a complementary anchoring device 103. The anchoring device 113 of the shim 11 is formed on a bearing surface 111 of the shim 11. The complementary anchoring device 103 of the housing 10 is formed on a bearing surface 101 of the housing and is located opposite the bearing surface 113 of the shim 11.

The anchoring device 113 of the shim 11 collaborates with the complementary anchoring device 103 of the housing 10 by means of engagement of complementary shapes. In the example shown in FIGS. 3 and 5, the anchoring device 113 of the shim 11 comprises a plurality of pyramidal structures 1131 which extend so as to project, with respect to the bearing surface 111 of said shim 11, and the complementary anchoring device 103 of the housing 10 comprises a plurality of pyramidal depressions 1031 formed on the bearing surface 101 of the housing 10. Each pyramidal depression 1031 of the housing 10 is designed to receive the corresponding pyramidal structure 1131 of the shim 11, at least in part.

Advantageously, the pyramidal structures 1131 of the anchoring device 113 of the shim 11 are regularly spaced along the longitudinal axis L thereof; and the pyramidal depressions 1031 of the complementary anchoring device 103 of the housing 10 are regularly spaced along the longitudinal axis L thereof. Advantageously again, a spacing pitch of the pyramidal structures 1131 is equal to a spacing pitch of the pyramidal depressions 1031, the spacing pitch being measured along the longitudinal axis L.

The anti-theft tracer 1 optionally also comprises an electrical connector 105, for example of the USB port type, making it possible to electrically connect the battery 15 of said anti-theft tracer 1 to an external electrical system (not shown in the drawings) in order to for example recharge and/or operate the anti-theft tracer 1. In addition, the electrical connector 105 is advantageously electrically connected to the battery 15 via a charging circuit which makes it possible to shape the electrical signal originating from the electrical system via the electrical connector 105, in order to render said signal compatible with said battery 15.

Figure 6:
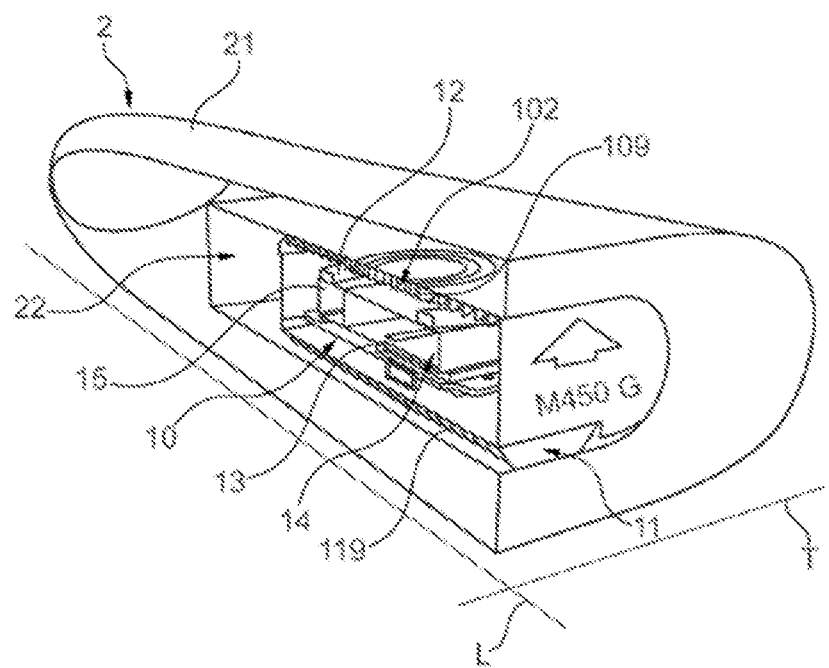
FIG. 6 is a truncated perspective view of a firearm that accommodates an anti-theft tracer according to the first aspect of the invention.

FIG. 6 shows a firearm 2 that accommodates an anti-theft tracer 1 according to the second aspect of the invention and as described above.

In the region of the axial end, the butt 21 of the firearm 2 comprises a reception recess 22 which accommodates the anti-theft tracer 1 as described above. The anti-theft tracer 1 in particular accommodates, in the housing 10 thereof, the electronic card 13 comprising the various electronic modules and components of the anti-theft tracer, the telecommunications antenna 14, the battery 15, and the electrical winding 12, in order to allow for inductive coupling.

As described above, the housing 10 of the anti-theft tracer 1 comprises the damping device 102 in order to damp the mechanical shocks and vibrations propagated within the butt 21 at the same time as a shot is fired using the firearm 2.

The housing 10 is pressed into the reception recess 22 of the butt 21, and preferably frictionally and/or by force, in order for the friction forces arising between the peripheral walls of the housing 10 and/or the damping device 102 thereof to be such as to allow for the housing 10 to be kept in position in the reception recess 22 when a shot is fired.

In particular, it is preferable for the housing 10 to be in contact with each wall, defining the reception recess 22, at least in part, with the possible exception of a wall that is located longitudinally to the front of the butt 21.

Such contact with the walls of the reception recess is made possible by adjusting the dimensions of the housing 10 to the dimensions of said reception recess, optionally by adding a first shim 11 in order to increase a lateral dimension of the housing 10 in the transverse direction T, and/or by adding a second shim 11 in order to increase a height of the housing 10, measured in a direction perpendicular to the transverse axis T and the longitudinal axis L. Said configuration is particularly advantageous because it makes it possible to lock the housing in the reception recess 22 with respect to two transverse directions.

In the longitudinal direction L, the housing is locked, and more particularly again with respect to a rearwards movement brought about by the recoil of the butt following the shot fired using the firearm 2, by virtue of the shape of the grooves 109 and/or the grooves 119 of the housing and/or of the shims 11, respectively.

The shims 11 can thus be manufactured in accordance with a plurality of series of different heights, the height being measured according to the axis that is simultaneously perpendicular to the longitudinal axis L and the transverse axis T, in order to be able to select the shim 11, making it possible to complete the free space left between the corresponding face of the housing 10 and the wall opposite the reception recess 21. Preferably, the shim is selected such that the corresponding grooves 119 are slightly stressed and deformed when the anti-theft tracer is inserted into the reception recess 21 in order to ensure good hold and optimal damping of mechanical vibrations and waves arising during use of the firearm 2.

In a very advantageous manner, the anti-theft tracer 1 according to the second aspect of the invention and as described above, is very particularly intended to be inserted into the butt 21 of a rifle, and more specifically into the butt 21 of a ball trap rifle, a carbine, or a hunting rifle.

In summary, the invention relates in particular to a geolocation method 200 for an anti-theft tracer 1 that is intended to be inserted into the butt 21 of a firearm 2, said geolocation method 200 making it possible to determine the geographic coordinates of said anti-theft tracer 1 and to detect an undesired movement. The geolocation method 200 also makes it possible to communicate with an apparatus in order to transmit data relating to the movement of the anti-theft tracer 1. The invention also relates to an anti-theft tracer 1 of this kind, which in particular comprises damping means 102 that make it possible to reduce the vibrations generated by use of the firearm 2, and transmitted to said anti-theft tracer 1.

Of course, the invention is not limited to the embodiments described above, and a number of developments can be made to said embodiments, without departing from the scope of the invention. In particular, the various features, types, variants, and embodiments of the invention may be associated with one another, in accordance with various combinations, insofar as they are not mutually incompatible or exclusive. In particular, all the variants and embodiments described above can be combined with one another.

The invention claimed is:

1. A geolocation method for a firearm using an anti-theft tracer, said geolocation method comprising the following steps:
   a step of determining geographic coordinates of the anti-theft tracer, using a geolocation module of said anti-theft tracer;
   a step of transmitting the geographic coordinates to a remote server, by means of a first or a second telecommunications module of the anti-theft tracer;
   a timeout step of providing an electrical supply to one or more of the geolocation module, the first telecommunications module, and the second telecommunications module in order to enable operation; and, following the timeout step,
   a step of putting the anti-theft tracer onto standby, in which an electronic circuit of said anti-theft tracer cuts off the electrical supply of the geolocation module and of the second telecommunications module,
   wherein the remote server transmits a first warning signal to a mobile telephone when the geographic coordinates determined by the geolocation module change relative to reference geographic coordinates taken before entering standby mode, and wherein the remote server transmits a second warning signal to the mobile telephone when the geographic coordinates determined by the geolocation module show a movement of the anti-theft tracer that is greater than a reference amplitude.

2. The geolocation method according to claim 1, wherein the first telecommunications module is designed to communicate with the remote server according to a Short Message Service (SMS) communications protocol, and/or the second telecommunications module is designed to communicate with the remote server according to a General Packet Radio Service (GPRS) or Long Range Wide Area Network (LoRaWAN) network protocol.

3. The geolocation method according to claim 1, wherein, if an accelerometer of the anti-theft tracer detects an acceleration of said anti-theft tracer that is above a reference threshold, when said anti-theft tracer is on standby, then:
   the electronic circuit of said anti-theft tracer reactivates the first and/or second telecommunications module and the geolocation module;
   the geolocation module determines the geographic coordinates of the anti-theft tracer;
   the first or the second telecommunications module transmits the geographic coordinates to the remote server.

4. An anti-theft tracer housed in a butt of a firearm, said anti-theft tracer comprising:
   a geolocation module;
   a first telecommunications module;
   a second telecommunications module; and
   an electronic circuit configured to:
      determine geographic coordinates of the anti-theft tracer, using the geolocation module;
      transmit the geographic coordinates to a remote server, by means of the first or the second telecommunications module;
      perform a timeout step of providing an electrical supply to one or more of the geolocation module, the first telecommunications module, and the second telecommunications module in order to enable operation; and, following the timeout step,
      put the anti-theft tracer onto standby, in which the electronic circuit cuts off the electrical supply of the geolocation module and of the second telecommunications module,
      wherein the remote server transmits a first warning signal to a mobile telephone when the geographic coordinates determined by the geolocation module change relative to reference geographic coordinates taken before entering standby mode, and
      wherein the remote server transmits a second warning signal to the mobile telephone when the geographic coordinates determined by the geolocation module show a movement of the anti- theft tracer that is greater than a reference amplitude.

5. The anti-theft tracer according to claim 4, said anti-theft tracer comprising a housing that accommodates:
   the geolocation module;
   the first telecommunications module which is designed to be able to communicate with the remote server;
   the second telecommunications module which is designed to be able to communicate with the remote server;
   a battery which is designed for electrically supplying the first telecommunications module and/or the second telecommunications module and/or the geolocation module;
   the electronic circuit that is designed to control the geolocation module, the first and the second telecommunications module, and the battery;
   said anti-theft tracer comprising a damping device adapted to damp vibrations, oscillations, and shocks when said anti-theft tracer is accommodated in a reception recess of the butt during a discharge of the firearm.

6. The anti-theft tracer according to claim 5, wherein the damping device comprises a plurality of grooves that extend on at least one peripheral surface of the housing, between a first lateral edge and a second opposing lateral edge of said housing.

7. The anti-theft tracer according to claim 6, wherein each groove extends in a straight manner, between the first lateral edge and the second lateral edge.

8. The anti-theft tracer according to claim 7, wherein, in a plane in parallel with a lateral edge of the housing, all the grooves have the same profile.

9. The anti-theft tracer according to claim 8, wherein each groove is formed by a first segment and a second segment that is adjacent to said first segment, said first segment being oriented in accordance with a first angle with respect to a longitudinal direction of the housing, and said second segment being oriented in accordance with a second angle with respect to said longitudinal direction of the housing.

10. The anti-theft tracer according to claim 5, and comprising at least one shim that is designed to be able to be fixed in a non-movable manner to a bearing surface of the housing and located opposite said at least one shim.

11. The anti-theft tracer according to claim 10, wherein each shim comprises an anchoring device that collaborates with a complementary anchoring device that is formed on the bearing surface of the housing and is located opposite said anchoring device.

12. The anti-theft tracer according to claim 11, wherein the anchoring device of the shim comprises a plurality of structures that extend so as to project relative to a bearing surface of said shim, against the bearing surface opposite the housing, the complementary anchoring device of said housing comprising a plurality of depressions that are formed on the bearing surface opposite, and designed so as to accommodate the corresponding structure.

13. The anti-theft tracer according to claim 12, wherein each shim comprises a plurality of grooves that extend on a surface opposite the bearing surface of said shim, between a first lateral edge and a second opposing lateral edge of said shim.

14. The anti-theft tracer according to claim 13, wherein a spacing pitch of the grooves of each shim is equal to a spacing pitch of a plurality of grooves that extend on at least one peripheral surface of the housing, between a first lateral edge and a second opposing lateral edge of said housing.

15. The anti-theft tracer according to claim 14, wherein a profile of the grooves of each shim is identical to a profile of the grooves of the housing.

16. The anti-theft tracer according to claim 10, wherein the housing and/or the at least one shim are made of a deformable material.

* * * * *